United States Patent
Han et al.

(10) Patent No.: US 10,618,126 B2
(45) Date of Patent: Apr. 14, 2020

(54) ELECTRICAL DISCHARGE MACHINE HAVING CONCENTRATION DETECTION FUNCTION FOR RUST INHIBITOR CONTAINING ORGANIC COMPOUND

(71) Applicant: FANUC Corporation, Yamanashi (JP)

(72) Inventors: Nan Han, Yamanashi (JP); Yasuo Nakashima, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 415 days.

(21) Appl. No.: 15/248,003

(22) Filed: Aug. 26, 2016

(65) Prior Publication Data

US 2017/0056990 A1    Mar. 2, 2017

(30) Foreign Application Priority Data

Aug. 27, 2015  (JP) .................................. 2015-168128

(51) Int. Cl.
| | | |
|---|---|---|
| *B23H 1/00* | (2006.01) | |
| *B23H 1/10* | (2006.01) | |

(Continued)

(52) U.S. Cl.
CPC ................. *B23H 1/10* (2013.01); *B23H 1/08* (2013.01); *B25J 11/0075* (2013.01);
(Continued)

(58) Field of Classification Search
CPC ... B23H 1/00; B23H 3/00; B23H 9/00; B23H 1/08; B23H 1/10; B23H 7/00; B23H 7/02
(Continued)

(56) References Cited

U.S. PATENT DOCUMENTS

| | | | | |
|---|---|---|---|---|
| 3,334,210 A | * | 8/1967 | Williams | ................. B23H 1/08 219/69.14 |
| 4,647,220 A | * | 3/1987 | Adams | .................... G01N 25/72 250/330 |

(Continued)

FOREIGN PATENT DOCUMENTS

| | | |
|---|---|---|
| CN | 104801798 A | 7/2015 |
| EP | 2347849 A1 | 7/2011 |

(Continued)

OTHER PUBLICATIONS

Decision to Grant a Patent in JP Patent Application No. 2015-168128, dated Aug. 15, 2017, 6 pp.
(Continued)

*Primary Examiner* — Dana Ross
*Assistant Examiner* — Ayub A Maye
(74) *Attorney, Agent, or Firm* — Hauptman Ham, LLP

(57) ABSTRACT

An electrical discharge machine is disclosed having a concentration detection function for a rust inhibitor containing an organic compound uses coloring of a metal complex produced through the reaction of the rust inhibitor with a color reagent to enable a detector to detect the change of characteristics involved in the change of the color of the metal complex. A predetermined amount of working fluid is sampled in a sampling cell at regular time intervals, a predetermined amount of color reagent is added to the working fluid, and the change of the color of the working fluid is detected by the detector.

10 Claims, 2 Drawing Sheets

(51) Int. Cl.
*C23F 11/10* (2006.01)
*C23F 11/00* (2006.01)
*B23H 1/08* (2006.01)
*B25J 11/00* (2006.01)
*G01N 21/27* (2006.01)

(52) U.S. Cl.
CPC .............. *C23F 11/00* (2013.01); *C23F 11/10* (2013.01); *G01N 21/27* (2013.01); *Y10S 901/43* (2013.01); *Y10S 901/44* (2013.01)

(58) Field of Classification Search
USPC ............ 219/69.1, 69.11, 69.14, 69.13, 69.15
See application file for complete search history.

(56) References Cited

U.S. PATENT DOCUMENTS

| | | | | |
|---|---|---|---|---|
| 4,767,906 | A | * | 8/1988 | Takahashi ................ B23H 1/08 219/69.14 |
| 5,411,889 | A | * | 5/1995 | Hoots .................. G01N 21/643 210/745 |
| 5,422,455 | A | * | 6/1995 | Sato ....................... B23H 1/022 219/69.12 |
| 5,744,365 | A | | 4/1998 | Pellet et al. |
| 6,037,768 | A | * | 3/2000 | Moulder ............ G01N 27/9046 324/202 |
| 2005/0183495 | A1 | * | 8/2005 | Ichikawa ............ B01L 3/50273 73/53.01 |
| 2007/0289925 | A1 | * | 12/2007 | Kawarai .................. B01J 47/14 210/681 |
| 2009/0111723 | A1 | * | 4/2009 | Shibata .................... B23H 1/08 508/463 |
| 2009/0239303 | A1 | * | 9/2009 | Rhoades ............... C12N 5/0068 435/402 |
| 2011/0240558 | A1 | | 10/2011 | Dohi et al. |
| 2013/0161293 | A1 | * | 6/2013 | Furuta ..................... B23H 1/08 219/69.11 |
| 2015/0160184 | A1 | | 6/2015 | Hanyuda et al. |
| 2015/0202704 | A1 | | 7/2015 | Yoshida et al. |
| 2016/0003756 | A1 | * | 1/2016 | Suzuki .................. G01J 27/06 210/767 |

FOREIGN PATENT DOCUMENTS

| | | |
|---|---|---|
| JP | 58-66632 A | 4/1983 |
| JP | 58-206324 A | 12/1983 |
| JP | 61-142443 A | 6/1986 |
| JP | 2001-519902 A | 10/2001 |
| JP | 2010-99809 A | 5/2010 |
| JP | 2011020185 A | 2/2011 |
| JP | 2013-82797 A | 5/2013 |

OTHER PUBLICATIONS

Extended European Search Report in EP Application No. 16184712.4, dated Jan. 20, 2017.
Office Action in CN Patent Application No. 201610743667.X, dated Jun. 20, 2018, 15 pages.

* cited by examiner

… (1)

ELECTRICAL DISCHARGE MACHINE HAVING CONCENTRATION DETECTION FUNCTION FOR RUST INHIBITOR CONTAINING ORGANIC COMPOUND

RELATED APPLICATIONS

The present application claims priority to Japanese Patent Application Number 2015-168128, filed Aug. 27, 2015, the disclosure of which is hereby incorporated by reference herein in its entirety.

BACKGROUND OF THE INVENTION

Field of the Invention

The present invention relates to an electrical discharge machine using a rust inhibitor for inhibiting corrosion of a workpiece, and more particularly, to an electrical discharge machine having a concentration detection function for the rust inhibitor.

Description of the Related Art

A workpiece (e.g., iron material or cemented carbide) is corroded if it is remain immersed in a working fluid (water) in a machining tank for a long period of time as it is machined by an electrical discharge machine. If the workpiece is corroded, it affects the external appearance, precision, strength and the like of a resulting machined product. In general, to prevent the corrosion of the workpiece, a rust inhibitor is added to the working fluid (water).

Active ingredients of the rust inhibitor can be roughly divided into inorganic and organic compounds. Organic amines, carboxylic acids and the like may be given as specific examples of the organic compounds. An organic compound adheres to the surface of the workpiece and forms a protective organic film on the workpiece, thereby achieving an anti-rust effect.

Although the anti-rust effect is reduced if the concentration of the rust inhibitor is too low, various troubles are caused if the concentration is too high (for example, degradation of the pipings of rubber or resinous material may possibly be accelerated). Therefore, the concentration of the rust inhibitor should be kept within an appropriate range.

The rust inhibitor adheres to sludge generated by machining and piping as well as to the workpiece surface and is exhausted, so that its concentration is reduced. When machining is not in progress, moreover, the concentration of the rust inhibitor increases due to evaporation of the working fluid (water). It is important to detect and control the concentration of the rust inhibitor.

Japanese Patent Application Laid-Open No. 2011-20185 discloses a technique that uses ionic (inorganic-compound) rust inhibitors such as sodium hydroxide, potassium hydroxide, ammonium hydroxide and the like for aqueous working fluids for electrical discharge machines (see, Paragraphs [0024] and of 2011-20185 application). The concentrations of these rust inhibitors are obtained based on an electrical conductivity measured by a conductivity meter of a liquidity measuring sensor.

Whereas in a concentration detection method for an organic rust inhibitor (active ingredient: organic compound), the concentration of the organic compound is generally calculated from the UV absorption intensity by means of high-speed chromatography. On an underequipped manufacturing floor, however, it is hard to detect the concentration of the organic compound in water. The technique disclosed in Japanese Patent Application Laid-Open No. 2011-20185, which is adapted to be applied to inorganic-compound rust inhibitors, cannot be applied to the measurement of the concentrations of organic-compound rust inhibitors. In common methods, therefore, the detection of the concentrations of such rust inhibitors in a working fluid is abandoned and a rust inhibitor is added regularly or after rusting is caused. According to any of these methods, however, the concentrations of the rust inhibitors in the working fluid cannot be confined within an appropriate range, so that the troubles described in the "BACKGROUND OF THE INVENTION" may be caused or the effect of the rust inhibitors cannot be fully achieved.

SUMMARY OF THE INVENTION

Accordingly, in view of the above-described problems of the prior art, the object of the present invention is to provide an electrical discharge machine having a concentration detection function for a rust inhibitor containing an organic compound.

An electrical discharge machine according to the present invention is configured to machine a workpiece immersed in a working fluid doped with a rust inhibitor, and comprises a characteristic value detection means for detecting a characteristic value of the working fluid attributable to a metal complex produced through the reaction of an organic compound contained in the rust inhibitor with a transition metal ion contained in a color reagent and a concentration detection means for detecting a concentration of the rust inhibitor based on the characteristic value detected by the detection means.

The characteristic value of the working fluid attributable to the metal complex is any one of a color, a light transmittance, and a refractive index, or a combination thereof.

The characteristic value detection means comprises a sample preparation means configured to form a sample for concentration detection by adding a predetermined amount of the color reagent to a predetermined amount of the working fluid and detects the characteristic value of the working fluid in the sample for concentration detection.

The electrical discharge machine may comprise an anti-rust efficacy determination means for determining an anti-rust efficacy based on the concentration of the rust inhibitor in the working fluid.

The concentration of the rust inhibitor in the working fluid or an anti-rust efficacy may be displayed on an operation screen of the electrical discharge machine.

The electrical discharge machine may comprise a rust inhibitor adding means, an adding means for a rust-inhibitor-free working fluid, and a concentration adjustment means for adjusting the concentration of the rust inhibitor in the working fluid or an anti-rust efficacy within a predetermined range, and the rust inhibitor or the rust-inhibitor-free working fluid may be added to a clean water tank in accordance with a command from the concentration adjustment means.

The color, the light transmittance, and the refractive index may be detected by an image pickup means.

The image pickup means may be connected to a robot.

A robot may execute the addition of the working fluid or the color reagent in the sample preparation means or the addition of the rust inhibitor or the rust-inhibitor-free working fluid to the working fluid in a clean water tank in accordance with a command from the concentration adjustment means.

According to the present invention, there can be provided an electrical discharge machine having a concentration detection function for a rust inhibitor containing an organic compound.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

Figure 1:
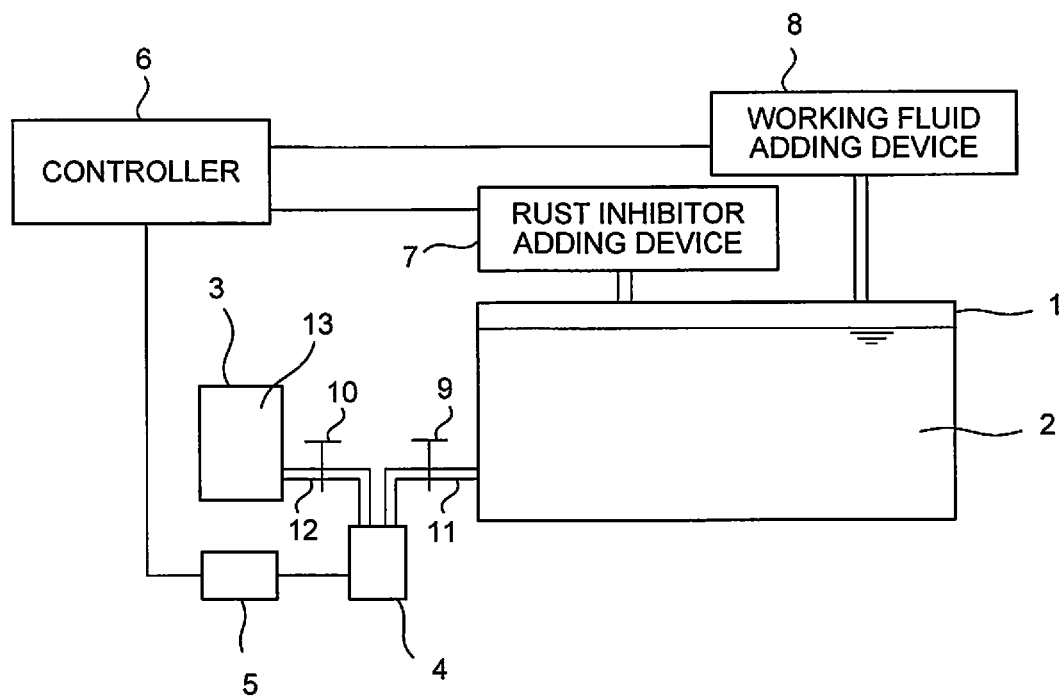
FIG. 1 is a diagram showing a schematic configuration of an electrical discharge machine furnished with a concentration detection means.

Embodiments of the present invention will now be described with reference to the accompanying drawings.

An electrical discharge machine is a device configured to electrical-discharge-machine an electrically conductive workpiece of a metal material or the like. The electrical discharge machine usually comprises a machining tank in which the workpiece is disposed to be subjected to electrical discharge machining, an electrode such as a wire electrode, a clean water tank storing a clean working fluid to be supplied to the machining tank, a controller for controlling the entire electrical discharge machine and the like. The machining tank is configured to store the working fluid in which the workpiece is immersed.

The workpiece (e.g., iron material or cemented carbide) is apt to corrode if it is remain immersed in the working fluid (water) in the machining tank for a long period of time as it is machined by the electrical discharge machine. If the workpiece is corroded, it affects the external appearance, precision, strength and the like of a resulting machined product. To prevent the corrosion of the workpiece, according to the present invention, a rust inhibitor is added to the working fluid (water). An organic compound is used as an active ingredient of the rust inhibitor. An organic amine, carboxylic acid or the like may be given as a specific example of the organic compound. The organic compound adheres to the surface of the workpiece and forms a protective organic film on the workpiece, thereby achieving an anti-rust effect.

Too low concentration of the rust inhibitor causes insufficient anti-rust effect, as described in the "BACKGROUND OF THE INVENTION" too high concentration brings various troubles (for example, degradation of piping pipings of rubber or resinous material may possibly be accelerated). It is therefore necessary to keep the concentration of the rust inhibitor within an appropriate range.

In the present invention, the color reaction of a metal complex produced through the reaction of the rust inhibitor (active ingredient: organic compound) with a color reagent (including transition metal ion) is used to enable a detector (e.g., optical sensor) to detect the change of characteristics involved in the change of the color of the metal complex. A predetermined amount of the working fluid is sampled at regular time intervals, a predetermined amount of the color reagent is added to the working fluid, and the change of the color of the working fluid is detected by the optical sensor. If the concentration of the rust inhibitor is lower than a certain value, the color of the working fluid lightens, the change of the color is detected by the optical sensor, and a command to add the rust inhibitor is issued to the controller. If the concentration of the rust inhibitor is higher than the certain value, in contrast, the color of the working fluid deepens, the change of the color is detected by the optical sensor, and a command to add the working fluid is issued to the controller. The following is a description of embodiments of the present invention.

Embodiment 1

FIG. 1 is a diagram showing a schematic configuration of an electrical discharge machine furnished with a concentration detection means according to an embodiment of the present invention. A clean water tank 1 is adapted to store a clean working fluid 2 to be supplied to a machining tank (not shown). The clean water tank 1 is provided with a sensor for measuring the volume of the clean working fluid stored therein. The sensor measures a momentarily changing total volume $V_t$ of the working fluid in the tank, and the result of the measurement is sent to a controller 6. A sampling cell 4 is a container that can store a certain amount of the working fluid. At least part of the sampling cell 4 has transparency such that incident light used for detecting the concentration of the rust inhibitor can be received by a detector 5, such as an optical sensor, after it is transmitted through the stored working fluid.

The sampling cell 4 is supplied with the working fluid 2 from the clean water tank 1 through a duct 11. A valve 9 for turning on and off the supply of the working fluid 2 to the sampling cell 4 is provided in the duct 11. The sampling cell 4 is also supplied with a color reagent 13 from a color reagent container 3 through a duct 12. The detector 5, e.g., an optical sensor, is a detector that receives light from a light source (not shown) incident on the working fluid in the sampling cell 4. The detector 5 detects characteristic values of the working fluid attributable to the metal complex produced through the reaction of the organic compound contained in the rust inhibitor in the working fluid 2 with the transition metal ion contained in the color reagent 13.

The controller 6 of a concentration detection device for detecting the concentration of the rust inhibitor in the working fluid 2 on/off-controls the valve 9 and a valve 10, thereby feeding a predetermined amount of the working fluid into the sampling cell 4 and also adding a predetermined amount of the color reagent 13 to the sampling cell 4 at regular time intervals. The controller 6 detects a characteristic value of the resulting fluid mixture (e.g., the color, transmittance, or refractive index n of the working fluid) by means of the detector 5, e.g., an optical sensor. When the detection of the characteristic value is finished, the working fluid in the sampling cell 4 is discharged from a discharge pipe (not shown) and collected in a waste water tank (not shown). In this case, the color reagent 13 should be removed through a filter. Alternatively, it may be discarded from the sampling cell 4.

Figure 2:
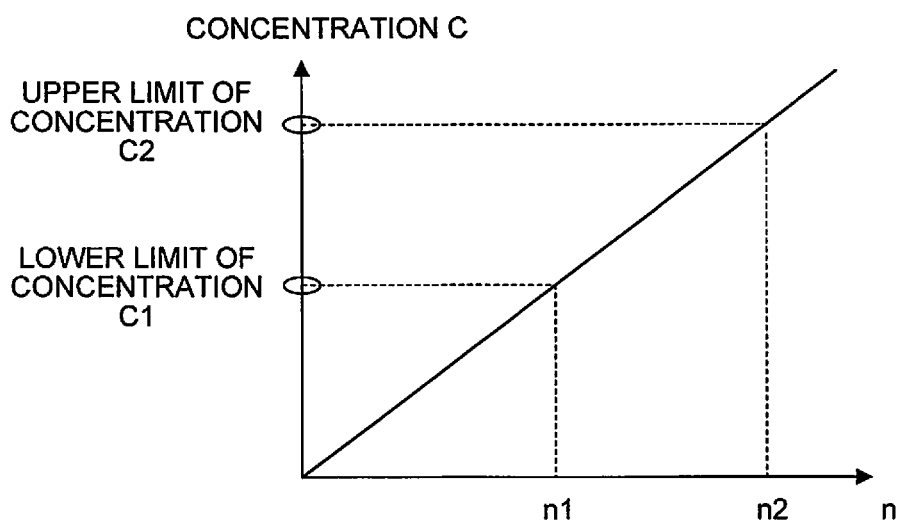
FIG. 2 is a graph showing the relationship between a refractive index n, i.e. one of characteristic values of a working fluid, and a concentration C of a rust inhibitor.

Data detected by the detector 5 is sent to the controller 6. The controller converts the acquired characteristic value into a concentration C and displays it on an operation screen (not shown) of the controller 6. The refractive index n of the working fluid, one of the characteristic values, is proportional to the concentration C of the rust inhibitor (FIG. 2).

The anti-rust effect depends on the concentration C of the rust inhibitor. A concentration range of the rust inhibitor in which the anti-rust effect can be achieved is assumed to be from C1 to C2. Symbols C1 and C2 denote the lower and upper limit values, respectively, of the concentration of the rust inhibitor such that the anti-rust effect can be achieved. The values C1 and C2, which can be obtained in advance by an experiment, vary depending on the material of the workpiece and the type of an additive. The anti-rust effect cannot be achieved if C<C1 holds. If C1<C<C2 holds, the anti-rust effect is achieved and the machine cannot be affected. If C>C2 holds, the machine is affected.

As described above, the controller 6 including an anti-rust effect determination means determines the anti-rust efficacy by comparing the concentration C of the rust inhibitor in the working fluid 2 measured by the sampling cell 4 with the reference range (C1 to C2). If the measured concentration C is deviated from the predetermined reference range, a warning is displayed on the operation screen and the machine automatically adjusts the concentration to the reference range by the following method.

If C<C1 holds, the rust inhibitor concentration is assured to be reduced, so that the anti-rust effect is determined to be insufficient. A target value $C_{targ}$ of the rust inhibitor concentration is assumed to be (C1+C2)/2, and the total volume of the working fluid in the clean water tank 1 to be V. The controller 6 calculates a necessary amount M of the rust inhibitor for the attainment of the target value ($M=[C_{targ}-C]\times V$). The controller 6 issues a command to a rust inhibitor adding device 7 to add the rust inhibitor to the working fluid in the clean water tank 1.

If C>C2 holds, the controller 6 calculates a necessary additional amount $V_{add}$ of the working fluid. Assumed that the total volume of the working fluid in the clean water tank 1 before addition of the fluid is $V_f$, the necessary additional amount of the working fluid is $V_{add}=C\times V_f/C_{targ}-V_f$. The controller 6 issues a command to a working fluid adding device 8 to add an additive-free working fluid to the working fluid in the clean water tank 1.

Figure 3:
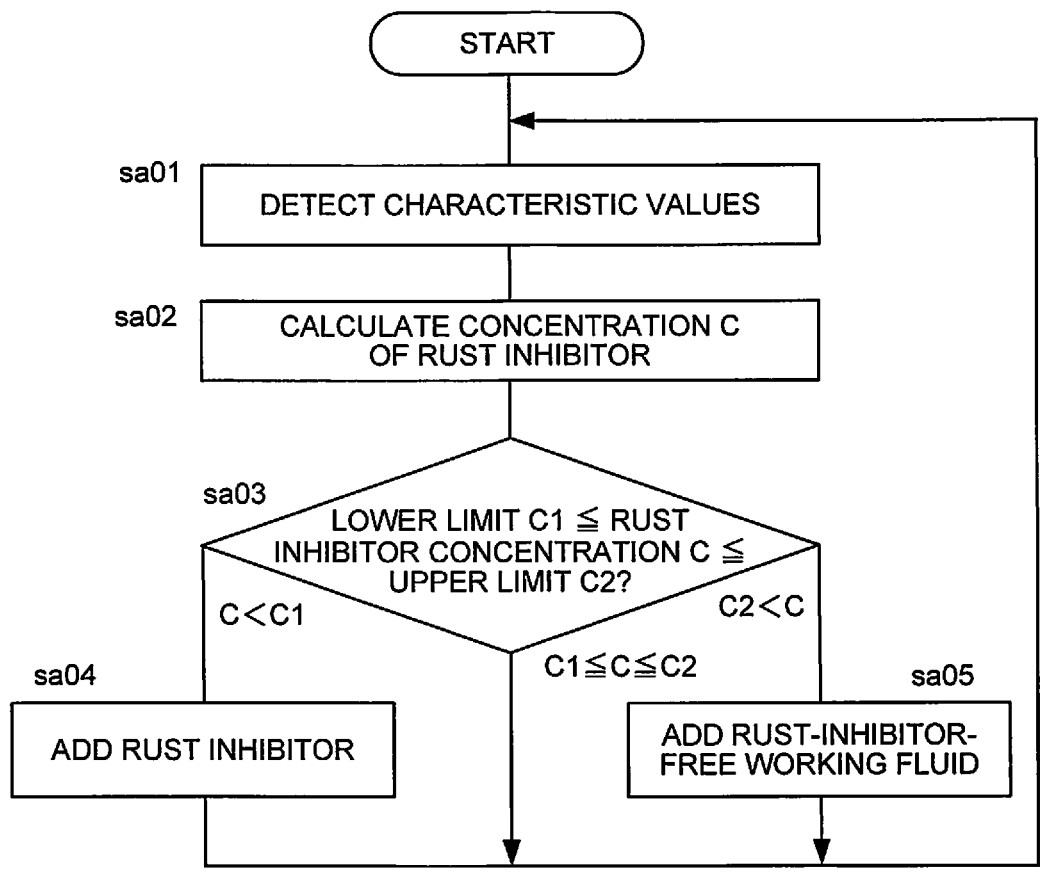
FIG. 3 is a flowchart illustrating control of the concentration of the rust inhibitor contained in the working fluid in a clean water tank.

FIG. 3 is a flowchart illustrating control of the concentration of the rust inhibitor in the working fluid in the clean water tank. The following is a sequential description of various steps of processing.

[Step sa01] The characteristic values are detected.

[Step sa02] The concentration C of the rust inhibitor is calculated.

[Step sa03] It is determined whether the concentration C of the rust inhibitor is not lower than the lower concentration limit C1 and not higher than the upper concentration limit C2. The processing proceeds to Step sa04 if C<C1 holds, returns to Step sa01 if C1≤C<C2 holds, and proceeds to Step sa05 if C2<C holds.

[Step sa04] If C<C holds, the rust inhibitor concentration is assured to be reduced, so that the anti-rust effect is determined to be insufficient. The target value $C_{targ}$ of the rust inhibitor concentration is assumed to be (C1+C2)/2, and the total volume of the working fluid in the clean water tank 1 to be V. The controller 6 calculates the necessary amount M of the rust inhibitor for the attainment of the target value ($M=[C_{targ}-C]\times V$). The controller 6 issues the command to the rust inhibitor adding device 7 to add the rust inhibitor. When the addition of the working fluid is finished, the processing returns to Step sa01.

[Step sa05] If C>C2 holds, the controller 6 calculates the necessary additional amount $V_{add}$ of the working fluid. Assumed that the total volume of the working fluid in the clean water tank 1 before addition of the fluid is $V_f$, the necessary additional amount of the working fluid is $V_{add}=C\times V_f/C_{targ}-V_f$. The controller 6 issues the command to the working fluid adding device 8 to add the working fluid. When the addition of the rust-inhibitor-free working fluid is finished, the processing returns to Step sa01.

Embodiment 2

Figure 4:
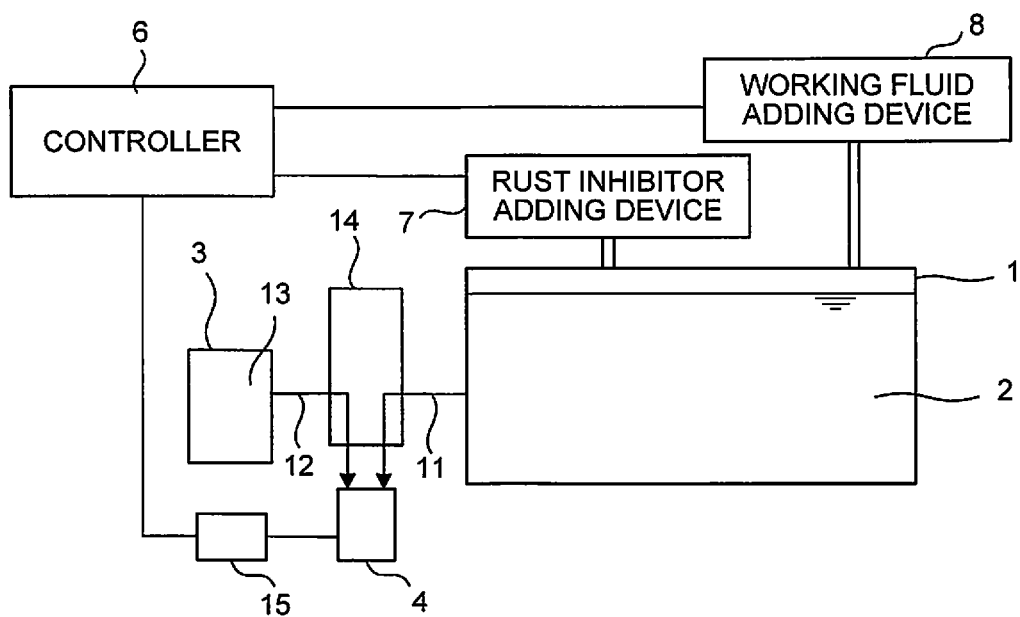
FIG. 4 is a diagram showing a schematic configuration of an electrical discharge machine furnished with a robot and a concentration detection means.

FIG. 4 is a diagram showing a schematic configuration of an electrical discharge machine furnished with a robot and a concentration detection means according to another embodiment of the present invention.

In the electrical discharge machine provided with a robot 14, a process for adding a working fluid to the sampling cell described in connection with Embodiment 1 is effected by the robot. The robot 14 extracts a predetermined amount of the working fluid from a clean water tank 1 and puts it into a sampling cell 4. Thereafter, the robot 14 extracts a predetermined amount of the color reagent and puts it into the sampling cell 4.

The resulting fluid mixture in the sampling cell 4 is mixed well by the robot 14, the sampling cell 4 is conveyed to a vision sensor 15 (image pickup device) of the robot 14, and the color (characteristic value) of the fluid mixture is detected by the vision sensor 15 of the robot 14. Since the characteristic values can be obtained by two-dimensional image processing, an average characteristic value can be obtained even if a rust inhibitor in the sampling cell 4 is contained at uneven concentrations in the working fluid.

A controller 6 estimates the anti-rust efficacy and feeds back the information to the robot 14. The robot 14 executes supply of the rust inhibitor or the working fluid containing no rust inhibitor as needed. Besides, the robot 14 may also be configured to perform on/off control of a valve 9 in a duct 11 and a valve 10 in a duct 12 in response to a command from the controller 6. Likewise, addition of the rust inhibitor or supply of the rust-inhibitor-free working fluid may be executed by on/off-controlling of a valve (not shown) provided in a duct connected from a rust inhibitor adding device 7 and a working fluid adding device 8 to the clean water tank 1. The robot 14 may be one that is adapted to be used in an operation for example for taking out a workpiece in a machining tank (not shown).

While embodiments of the present invention have been described herein, the invention is not limited to the above-described embodiments and may be suitably modified and embodied in various forms.

The invention claimed is:

1. An electrical discharge machine, comprising:
   a machining tank configured to contain a working fluid doped with a rust inhibitor;
   a controller configured to control machining of a workpiece by electrical discharge between a wire electrode and the workpiece, which is immersed in the working fluid doped with the rust inhibitor in the machining tank;
   a clean working fluid tank configured to contain the working fluid to be supplied to the machining tank;
   a color reagent container configured to contain a color reagent;
   a sampling cell configured to store a predetermined amount of the working fluid from the clean working fluid tank and the color reagent from the color reagent container; and
   a detector configured to receive incident light transmitted through the working fluid stored in the sampling cell, to detect a characteristic value of the working fluid attributable to a metal complex produced through the reaction of an organic compound contained in the rust inhibitor with a transition metal ion contained in the color reagent, wherein the controller is further configured to determine a concentration of the rust inhibitor in the working fluid, based on the characteristic value detected by the detector.

2. The electrical discharge machine according to claim 1, wherein the characteristic value of the working fluid attributable to the metal complex is any one of a color, a light transmittance, and a refractive index, or a combination of the same.

3. The electrical discharge machine according to claim 1, wherein
the sampling cell is configured to form a sample for concentration detection by adding a predetermined amount of the color reagent to the predetermined amount of the working fluid stored in the sampling cell, and
the detector is configured to detect the characteristic value of the working fluid in the sample for concentration detection.

4. The electrical discharge machine according to claim 1, wherein
the controller is configured to determine an anti-rust efficacy based on the concentration of the rust inhibitor in the working fluid.

5. The electrical discharge machine according to claim 1, further comprising an operation screen configured to display the concentration of the rust inhibitor in the working fluid or an anti-rust efficacy.

6. The electrical discharge machine according to claim 2, wherein the detector comprises an optical sensor configured to detect the color, the light transmittance, and the refractive index of the working fluid.

7. The electrical discharge machine according to claim 6, further comprising a robot connected to the optical sensor.

8. The electrical discharge machine according to claim 3, further comprising:
a robot configured to, in accordance with a command from the controller, execute
addition of the working fluid or the color reagent in the sampling cell, or
addition of the rust inhibitor or a rust-inhibitor-free working fluid to the clean working fluid tank.

9. An electrical discharge machine configured to machine a workpiece immersed in a working fluid doped with a rust inhibitor, the electrical discharge machine comprising:
a sampling cell configured to store a predetermined amount of the working fluid;
a detector configured to receive incident light transmitted through the working fluid stored in the sampling cell, to detect a characteristic value of the working fluid attributable to a metal complex produced through the reaction of an organic compound contained in the rust inhibitor with a transition metal ion contained in a color reagent;
a controller configured to detect a concentration of the rust inhibitor based on the characteristic value detected by the detector,
a clean working fluid tank containing the working fluid;
a color reagent container containing the color reagent;
a first duct connecting the sampling cell with the clean working fluid tank to supply the sampling cell with the working fluid from the clean working fluid tank through the first duct; and
a second duct connecting the sampling cell with the color reagent container to supply the sampling cell with the color reagent from the color reagent container through the second duct.

10. The electrical discharge machine according to claim 9, further comprising:
a waste tank; and
a discharge pipe configured to, after the detector detects the characteristic value of the working fluid in the sampling cell, discharge the working fluid in the sampling cell from the discharge pipe to be collected in the waste tank of the electrical discharge machine.

* * * * *